(12) United States Patent
Suzuki et al.

(10) Patent No.: US 8,459,686 B2
(45) Date of Patent: Jun. 11, 2013

(54) STEERING WHEEL WITH AIRBAG DEVICE

(75) Inventors: Norio Suzuki, Aichi-ken (JP); Kenji Sasaki, Aichi-ken (JP); Koji Sakurai, Aichi-ken (JP); Hitoshi Iida, Aichi-ken (JP); Osamu Hirose, Aichi-ken (JP); Akira Urayama, Obu (JP)

(73) Assignees: Toyoda Gosei Co., Ltd., Aichi-pref. (JP); Matsuo Industries, Inc., Aichi-pref. (JP)

( * ) Notice: Subject to any disclaimer, the term of this patent is extended or adjusted under 35 U.S.C. 154(b) by 810 days.

(21) Appl. No.: 12/585,454

(22) Filed: Sep. 15, 2009

(65) Prior Publication Data
US 2010/0066062 A1    Mar. 18, 2010

(30) Foreign Application Priority Data

Sep. 16, 2008 (JP) ................................. 2008-236809

(51) Int. Cl.
*B60R 21/16* (2006.01)

(52) U.S. Cl.
USPC .................................. 280/728.2; 280/61.54

(58) Field of Classification Search
USPC .................. 280/728.2, 731; 200/61.54, 61.55
See application file for complete search history.

(56) References Cited

U.S. PATENT DOCUMENTS

| 6,719,324 | B2 * | 4/2004 | Albers et al. .................. 280/731 |
| 6,881,911 | B2 | 4/2005 | Sugimoto | |
| 2002/0011721 | A1 | 1/2002 | Kikuta et al. | |
| 2006/0027448 | A1 | 2/2006 | Helmstetter et al. | |

FOREIGN PATENT DOCUMENTS

| DE | 601 22 821 | | 9/2007 |
| JP | 63-133411 | A | 6/1988 |
| JP | 6-1245 | A | 1/1994 |
| JP | A-6-312643 | | 11/1994 |
| JP | 10-157548 | A | 6/1998 |
| JP | A-2004-284414 | | 10/2004 |
| JP | 2005-38811 | A | 2/2005 |
| JP | 2006-294379 | A | 10/2006 |

OTHER PUBLICATIONS

Office Action dated Nov. 16, 2010, from the Japan Patent Office corresponding to the JP Patent Application No. 2008-236809.
Office Action dated Jan. 27, 2012 in corresponding DE Application No. 10 2009 040 303.5 (and English translation).
Office Action dated Jun. 29, 2010 from the Japan Patent Office corresponding to the JP Patent Application No. 2008-236809.

* cited by examiner

*Primary Examiner* — Eric Culbreth
(74) *Attorney, Agent, or Firm* — Posz Law Group, PLC

(57) ABSTRACT

A horn switch mechanism 15 has a securing pin 31 serving as a support member, a movable member 32 serving as an insulating portion, a compression coil spring 35 serving as an urging member, and a contact terminal 34 serving as a movable contact. The securing pin 31 is fixed to a metal core 12 of a steering wheel body 11 and supports a bag holder 21 in such a manner that the bag holder 21 selectively proceeds toward and retreats from the metal core 12. The movable member 32 is arranged between the securing pin 31 and the bag holder 21 and electrically insulates the securing pin 31 and the bag holder 21 from each other. The coil spring 35 urges the bag holder 21 away from the metal core 12. The contact terminal 34 moves together with the bag holder 21. When the bag holder 21 moves toward the metal core 12 against the urging force of the compression coil spring 35, the contact terminal 34 contacts the securing pin 31 and permits conduction between the contact terminal 34 and the securing pin 31. This activates a horn device 40 of the vehicle.

7 Claims, 6 Drawing Sheets

STEERING WHEEL WITH AIRBAG DEVICE

BACKGROUND OF THE INVENTION

The present invention relates to a steering wheel having an airbag device (an airbag module) for protecting the head and the part near the head of an occupant seated on the driver's seat of a vehicle.

Conventionally, in this type of steering wheel, an airbag device is installed in a central portion of a steering wheel body fixed to a steering shaft of a vehicle (see, for example, Japanese Laid-Open Patent Publication No. 2004-284414). The airbag device has a pad forming an ornamental surface at the center of the steering wheel. A bag holder is attached to the backside of the pad and an airbag is received in the space between the bag holder and the pad in a folded state. A horn plate is arranged in the steering wheel body to face the backside of the bag holder. The horn plate has a fixed portion fixed to the steering wheel body. A plurality of horn switch mechanisms are arranged between the horn plate and the bag holder and support the bag holder.

Each of the horn switch mechanisms includes a bolt, a fixed member, a movable member, and a compression coil spring. The bolt is passed through the horn plate from the steering wheel body and threaded to the bag holder. The bolt is inserted also through the fixed member and the movable member. The coil spring is arranged between the fixed member and the movable member. The fixed member is provided close to the horn plate and has a fixed contact. The movable member is arranged close to the bag holder and has a movable contact. The coil spring urges the movable member toward the bag holder in such a manner that the movable contact is separated from the fixed contact.

In this airbag device, the pad, the bag holder, and the movable members and the bolts of the horn switch mechanisms are integrally movable toward the horn plate against the urging force of coil springs. The backside of the head of each bolt contacts the horn plate. This restricts separation of the bag holder from the horn plate in such a range that the distance between the bag holder and the horn plate does not exceed a predetermined distance, despite the urging force of the coil springs applied to the bag holder. When the pad is pressed toward the steering wheel body, the movable contact of a horn switch mechanism contacts and is electrically connected to the fixed contact. This activates the horn of the vehicle. Further, when the vehicle receives impact, gas is generated in an inflator and inflates an airbag instantly. As a result, the impact acting on the driver is attenuated.

Since the airbag of the above-described steering wheel having the airbag device functions also as the mechanism for activating the horn, the airbag device and the horn mechanisms are configured complicatedly and have a large number of components. In this regard, the conventional steering wheel has plenty of room for improvement.

SUMMARY OF THE INVENTION

Accordingly, it is an objective of the present invention to provide a steering wheel with an airbag device that reduces the number of components.

To achieve the foregoing objective and in accordance with one aspect of the present invention, a steering wheel having an airbag device of a vehicle is provided. The steering wheel includes a metal core fixed to a steering shaft of the vehicle and a horn switch mechanism by which a horn of the vehicle is activated. The airbag device is joined to the metal core. The horn is activated through the horn switch mechanism when the airbag device is depressed. The airbag device includes a pad, bag holder attached to a backside of the pad, and an airbag received in a space between the pad and the bag holder in a folded state. The horn switch mechanism includes a support member, an insulating portion, an urging member, and a movable contact. The support member is fixed to the metal core and supports the bag holder in such a manner that the bag holder is allowed to selectively proceed toward and retreat from the metal core. The insulating portion is arranged between the support member and the bag holder to electrically insulate the support member and the bag holder from each other. The urging member urges the bag holder away from the metal core. The movable contact moves together with the bag holder. When the bag holder moves toward the metal core against the urging force of the urging member, the movable contact contacts the support member to permit conduction in the horn switch mechanism, thereby activating the horn.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

One embodiment of the present invention will now be described with reference to the attached drawings.

Figure 1:
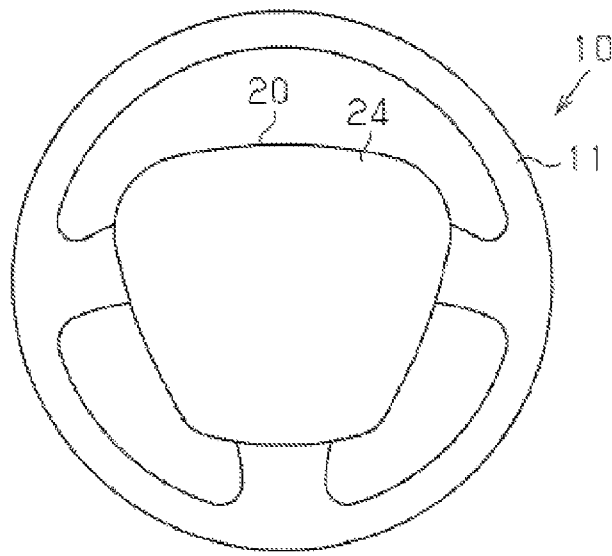
FIG. 1 is a front view showing a steering wheel according to one embodiment of the present invention.

As shown in FIG. 1, a steering wheel 10 of the illustrated embodiment has a steering wheel body 11 held by the driver of a vehicle to steer the vehicle and an airbag device (an airbag module) 20 installed in a central portion of the steering wheel body 11.

Figure 2:
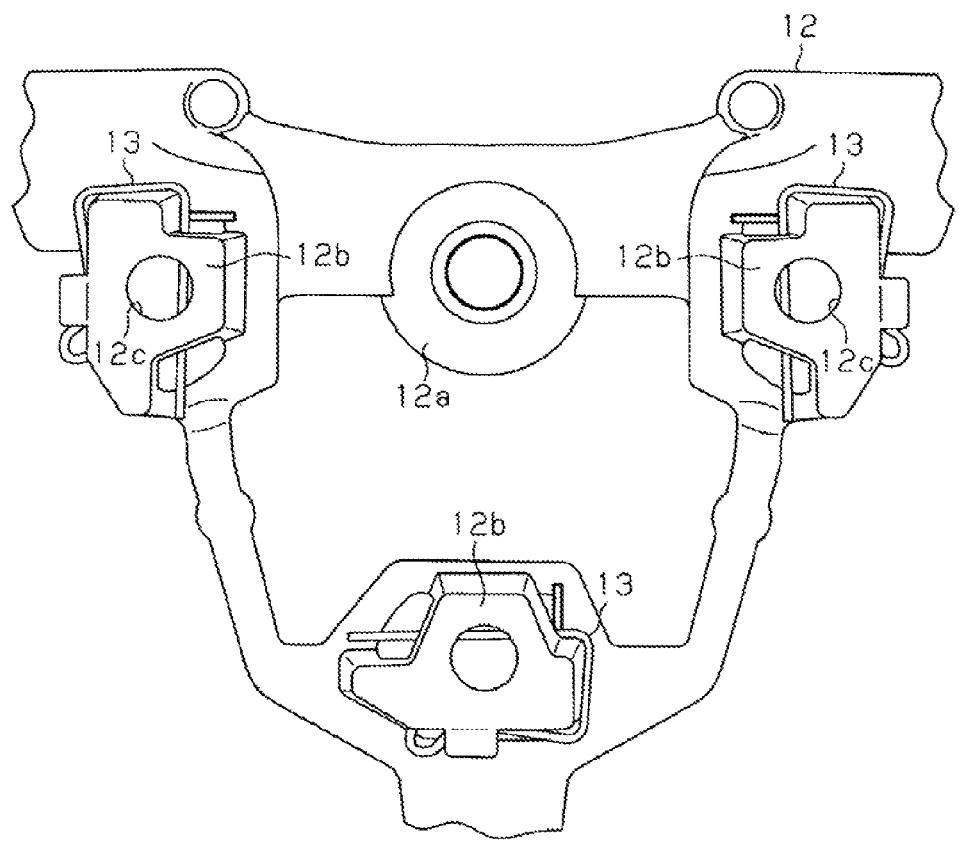
FIG. 2 is a front view showing a portion of the steering wheel body of the steering wheel illustrated in FIG. 1.
Figure 3:
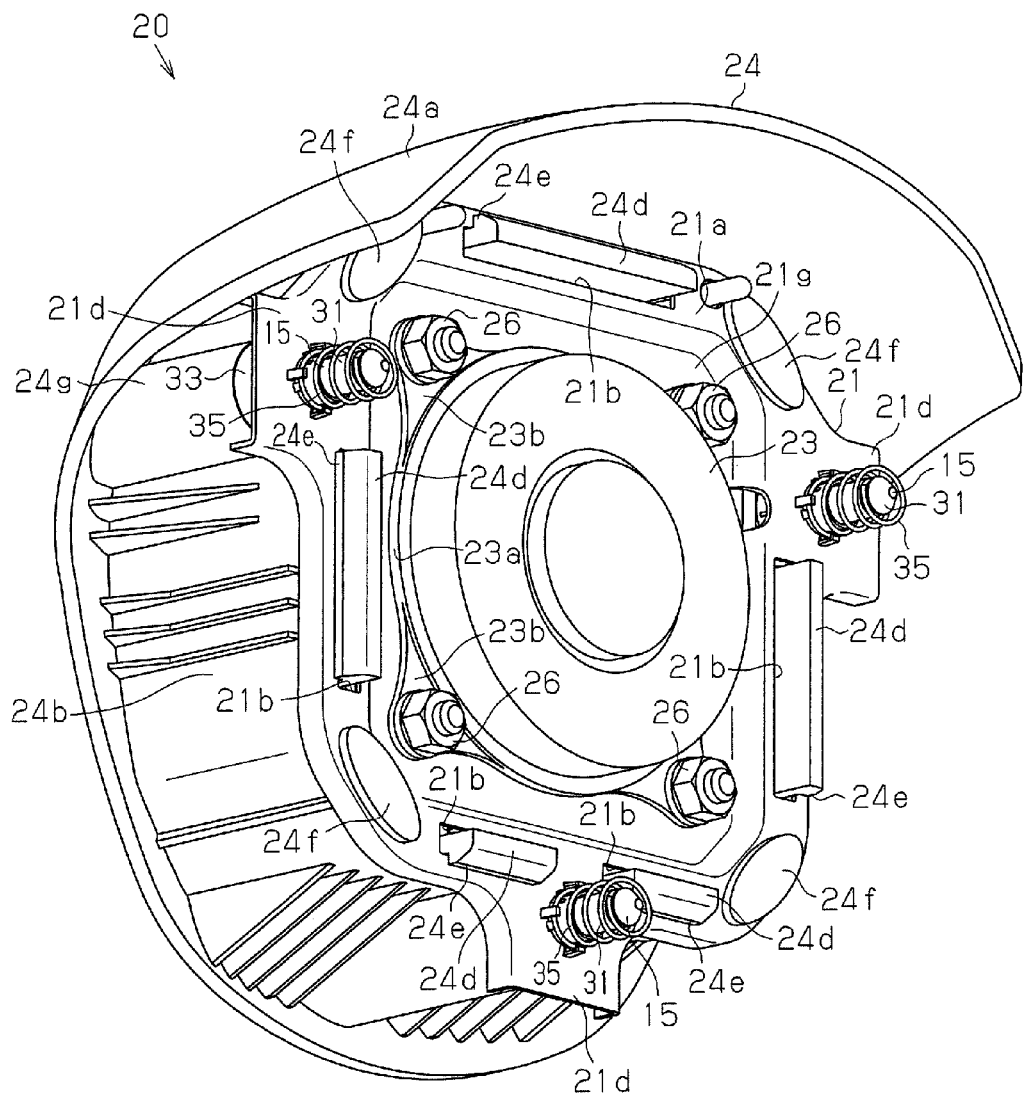
FIG. 3 is a rear perspective view showing an airbag device arranged in the steering wheel of FIG. 1.

The steering wheel body 11 also has a metal core 12. FIG. 2 shows a central portion of the metal core 12. The steering wheel body 11 is fixed to a steering shaft (not shown) through a boss 12a of the metal core 12. Three attachment portions 12b are arranged around the boss 12a to attach the airbag device 20. Two of the attachment portions 12b are arranged at opposite sides of the boss 12a in such a manner that the boss 12a is located between the attachment portions 12b. The other one of the attachment portions 12b is arranged below the boss 12a. A clip 13 is mounted in each of the attachment portions 12b. A horn switch mechanism 15, which supports the airbag device 20 and functions as a horn switch as illustrated in FIG. 3, is mounted in each attachment portion 12b through a snap fit structure. Each of the snap fit structures is configured by the corresponding one of the attachment portion 12b and the associated clip 13. The airbag device 20 is supported by the metal core 12 through the horn switch mechanisms 15.

Figure 4:
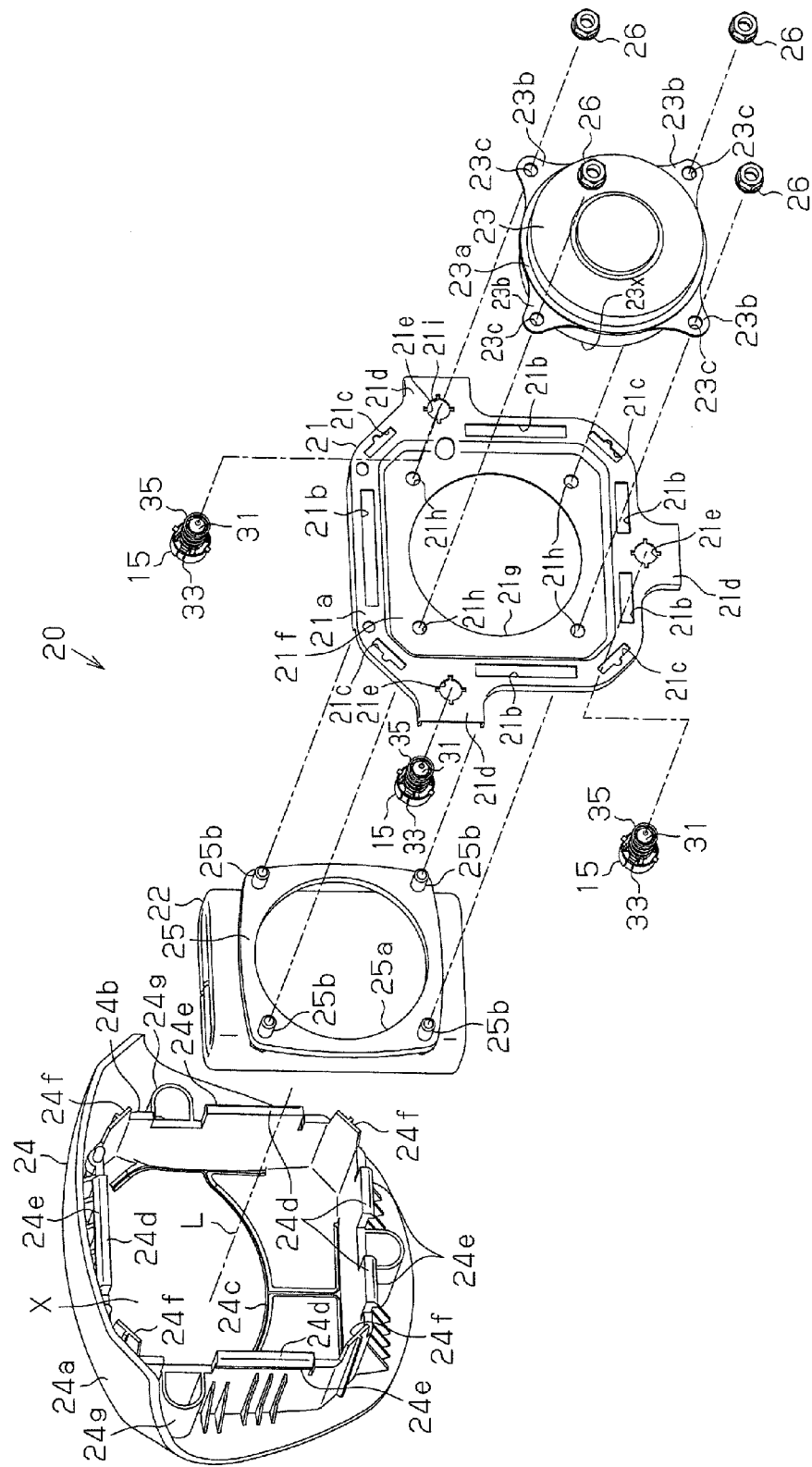
FIG. 4 is an exploded perspective view showing the airbag device illustrated in FIG. 3.

As shown in FIGS. 3 and 4, the airbag device 20 has a bag holder 21, an airbag 22, an inflator 23, and a pad 24. The bag holder 21 is formed by pressing a metal plate and has a substantially rectangular shape. A periphery fixing portion 21a, which has a substantially rectangular loop, is formed in a peripheral end of the bag holder 21 and fixes the pad 24.

The pad 24 is molded from resin. The pad 24 has an outer cover 24a, which forms an ornamental surface at the surface of the pad 24, and an accommodation wall 24b having a substantially rectangular loop shape, which is formed at the backside of the pad 24. The accommodation wall 24b, the inner surface of the outer cover 24a encompassed by the accommodation wall 24b, and the bag holder 21 define a bag accommodation space X in which the airbag 22 is accommodated. A thin portion 24c, which is to be torn apart when the airbag 22 is inflated and deployed, is formed in a portion of the outer cover 24a that forms the bag accommodation space X.

Five engagement claws 24d, each of which has a rectangular plate-like shape, are formed integrally with the end surface of the accommodation wall 24b. Specifically, one of the engagement claws 24d is arranged on the upper wall portion of the accommodation wall 24b, another one is arranged on the left wall portion, and another one is arranged on the right wall portion. The other two of the engagement claws 24d are provided on the lower wall portion of the accommodation wall 24b. The engagement claws 24d are each shaped in a laterally elongated manner with a predetermined width. An engagement projection 24e, which projects outward from the outer surface of the distal end of each engagement claw 24d, is formed at the distal end of the engagement claw 24d. A rectangular plate-like swaging piece 24f is formed integrally with an end surface located at each corner of the accommodation wall 24b.

Correspondingly, engagement holes 21b are formed in the periphery fixing portion 21a, which is shaped like a rectangular loop, at the positions corresponding to the engagement claws 24d of the pad 24. Specifically, one of the engagement holes 21b is formed in the upper side of the periphery fixing portion 21a, another one is formed in the left side, and another one is formed in the right side. The other two of the engagement holes 21b are formed in the lower side of the periphery fixing portion 21a. In correspondence with the laterally elongated engagement claws 24d, the engagement holes 21b are slits extending along the corresponding sides of the bag holder 21. Each of the engagement holes 21b extends in the widthwise direction of the bag holder 21 in such a manner as to extend through the periphery fixing portion 21a of the bag holder 21. A distal portion of each of the engagement claws 24d is passed through and engaged with the corresponding one of the engagement holes 21b. Specifically, each engagement claw 24d is inserted through the corresponding engagement hole 21b in a state flexed inwardly by the amount corresponding to the width of the associated engagement projection 24e. The engagement claws 24d then restore their original postures and thus become engaged with the peripheral ends of the engagement holes 21b. This prevents the engagement claws 24d from separating from the corresponding engagement holes 21b.

Through holes 21c for swaging, through which the swaging pieces 24f are passed, are formed in the corners of the bag holder 21. Each of the through holes 21c is shaped like a slit and extends through the bag holder 21. Each one of the through holes 21c receives one of the swaging pieces 24f. Afterwards, heat swaging is performed by heating and deforming the distal ends of the swaging pieces 24f (see FIG. 3). The pad 24 is thus fixed to the bag holder 21 through the heat swaging of the swaging pieces 24f and engagement of the engagement claws 24d.

A substantially square seat 21f is formed at a position inward from the periphery fixing portion 21a of the bag holder 21. A circular opening 21g is formed at the center of the seat 21f. Screw insertion holes 21h are formed at the corners of the square seat 21f and at positions around the opening 21g. A total of four screw insertion holes 21h are located on diagonal lines on the seat 21f. A columnar inflator 23 is attached to the seat 21f. A portion of the inflator 23 is received in the opening 21g of the seat 21f.

The inflator 23 has a flange 23a extending radially outward. Four attachment pieces 23b are formed in the flange 23a to extend further radially outward and spaced apart at equal angular intervals. Screw insertion holes 23c are formed in the respective attachment pieces 23b in correspondence with the screw insertion holes 21h of the bag holder 21. The portion of the inflator 23 facing the airbag 22 with the flange 23a serving as the boundary forms a gas outlet 23x. The inflator 23 is passed through the opening 21g of the bag holder 21 in such a manner that the gas outlet 23x projects into the bag accommodation space X. With the flange 23a held in contact with the seat 21f, which is located around the opening 21g, the inflator 23 is attached to the bag holder 21 together with a ring retainer 25, which will be described below.

The ring retainer 25 has a circular opening 25a the size of which is substantially equal to the opening 21g of the bag holder 21, through which the gas outlet 23x of the inflator 23 is inserted. The ring retainer 25 has four attachment screws 25b, which are passed through the corresponding screw insertion holes 21h of the bag holder 21. The portion of the airbag 22 corresponding to the opening of the airbag 22 is attached to the ring retainer 25 with the airbag 22 folded in an inflatable and deployable manner. Although not shown for the illustrative purposes, the portion of the ring retainer 25 other than the opening 25a is covered by a portion of the airbag 22. The ring retainer 25 to which the airbag 22 is secured, the bag holder 21, and the inflator 23 are fixed together in this order. Specifically, as illustrated in FIG. 4, the attachment screws 25b of the ring retainer 25 are inserted through the screw insertion holes 21h of the bag holder 21 and the screw insertion holes 23c of the inflator 23. Nuts 26 are then threaded to the attachment screws 25b. This fixes the airbag 22 to the bag holder 21 through the ring retainer 25 and, simultaneously, fixes the inflator 23 to the bag holder 21.

Three attachment portions 21d, to which the horn switch mechanisms 15 are attached, are formed in the periphery fixing portion 21a of the bag holder 21. Two of the attachment portions 21d are arranged in the left side and the right side of the periphery fixing portion 21a, respectively, and each attachment portion 21d is located between an engagement hole 21b and an insertion hole 21c. The other one of the attachment portions 21d is located at a middle position between the two engagement holes 21b in the lower side of the periphery fixing portion 21a. An attachment hole 21e, through which the corresponding horn switch mechanism 15 is attached, is formed in each of the attachment portion 21d and extends through the bag holder 21.

Three switch support portions 24g for supporting the horn switch mechanisms 15 are formed in the pad 24 at positions facing the corresponding attachment portions 21d of the bag holder 21. With reference to FIG. 4, the switch support portions 24g are formed integrally with the accommodation wall 24b of the pad 24, extending from the backside of the pad 24 along the axis L of the pad 24. Specifically, the switch support portions 24g project outward (with respect to the bag accommodation space X) from the accommodation wall 24b. The switch support portions 24g are bent in U shapes as viewed from the front (in the direction along the axis L of the pad 24). Each of the switch support portions 24g is connected to the accommodation wall 24b at the two ends of the switch support portion 24g forming the U shape. Each switch support portion 24g is hollow. The switch support portions 24g, which are constructed as described above, function as ribs reinforcing the accommodation wall 24b, thus improving strength of the accommodation wall 24b.

[Configuration of Horn Switch Mechanism]

Figure 5:
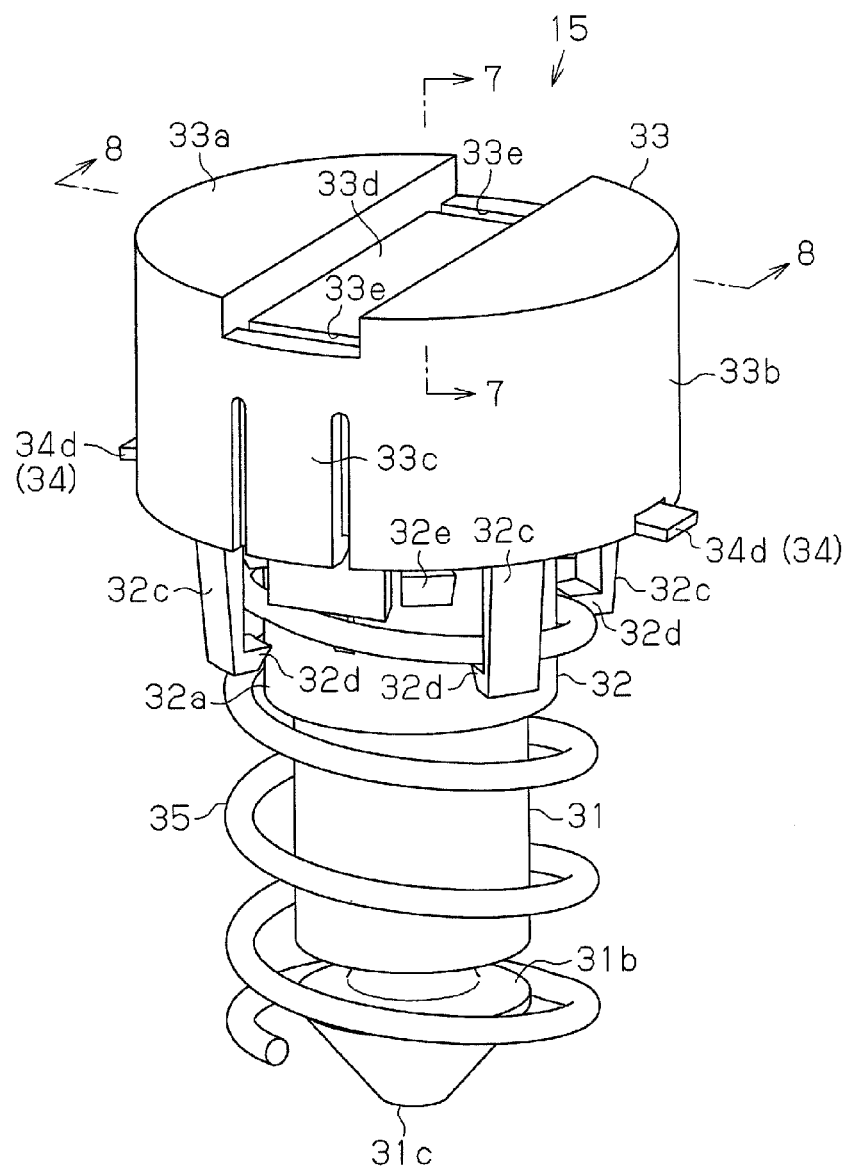
FIG. 5 is a perspective view showing a horn switch mechanism of the airbag device of FIG. 3.
Figure 6:
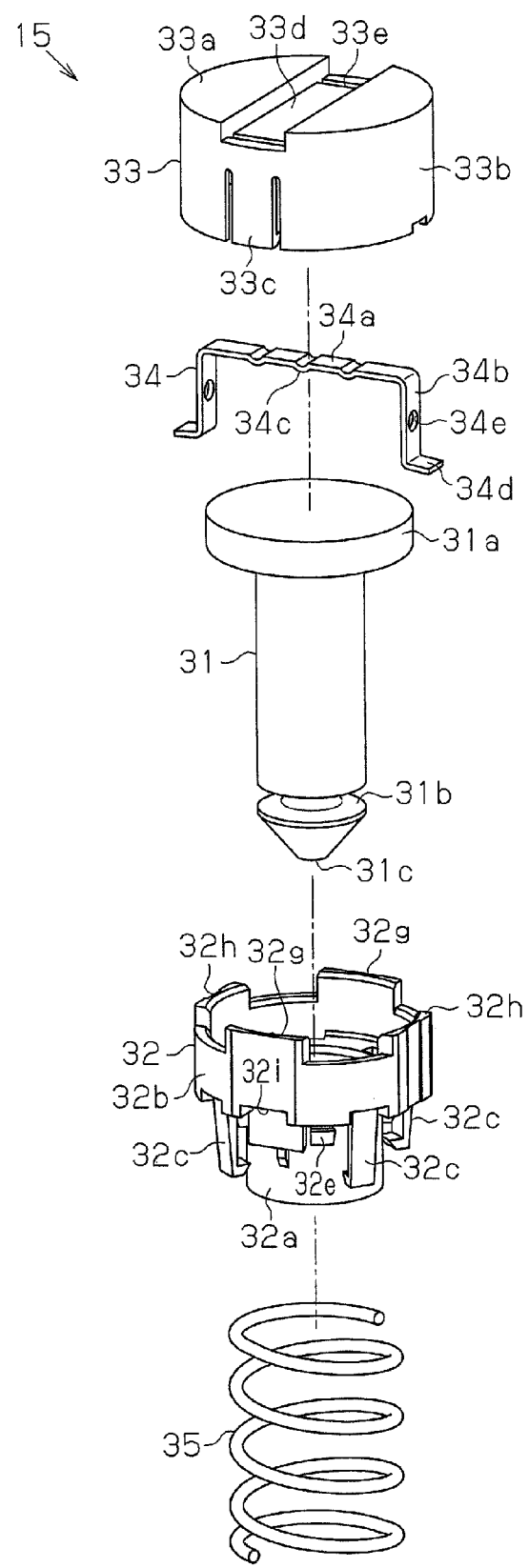
FIG. 6 is an exploded perspective view showing the horn switch mechanism illustrated in FIG. 5.

The steering wheel 10 of the illustrated embodiment has three horn switch mechanisms 15. As illustrated in FIGS. 5 and 6, each of the horn switch mechanisms 15 has a metal securing pin 31 serving as a support member, a movable member 32 serving as an insulating portion, a resin cap 33 joined to the movable member 32, a contact terminal 34 serving as a movable contact arranged inside the cap 33, and a compression coil spring 35 serving as an urging member.

The securing pin 31 substantially has a columnar shape. The securing pin 31 has a circular cross section over the entire length of the securing pin 31. A head 31a, which extends perpendicular to the longitudinal direction of the securing pin 31, is formed at the upper end (the end facing the pad 24) of the securing pin 31. An engagement groove 31b is formed in the vicinity of the lower end of the securing pin 31 and over the entire circumference of the securing pin 31.

Figure 8:
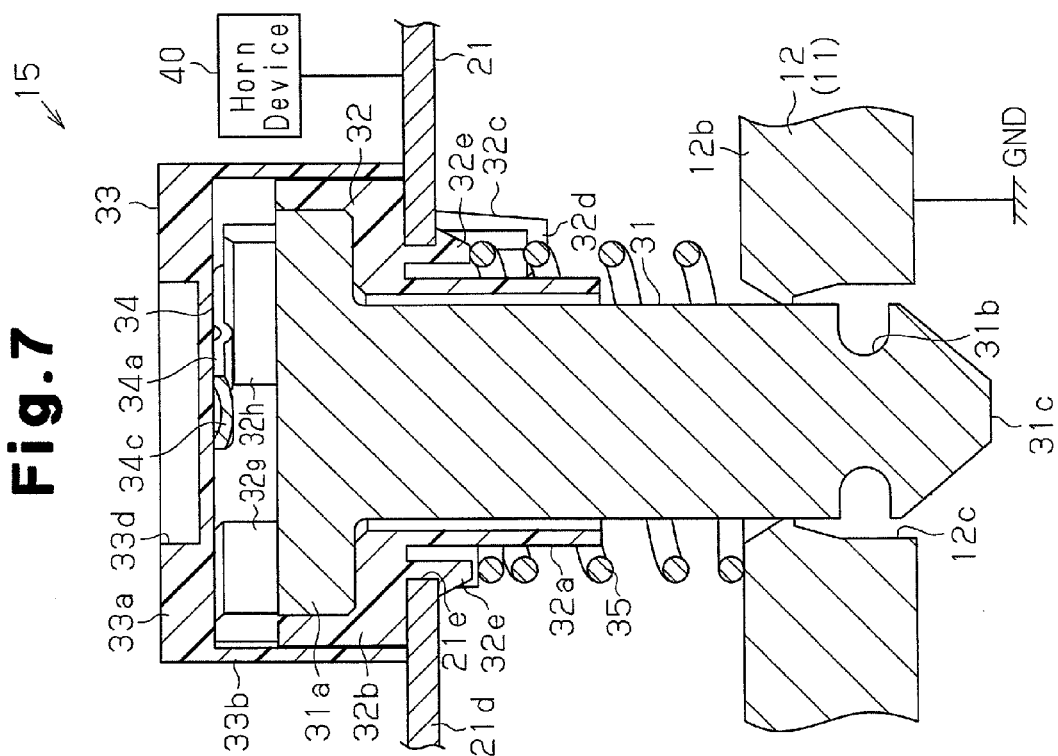
FIG. 8 is a cross-sectional view taken along line 8-8 of FIG. 5, showing the horn switch mechanism in an installed state.

As illustrated in FIG. 8, each securing pin 31 is passed through the corresponding insertion hole 12c, which is formed in the attachment portion 12b of the metal core 12 (the steering wheel body 11). The clip 13 of the attachment portion 12b is engaged with the engagement groove 31b of the securing pin 31. In other words, the securing pin 31 is engaged by a structure in which the securing pin 31 is fixed to the attachment portion 12b simply by inserting the securing pin 31 through the insertion hole 12c until the securing pin 31 reaches a predetermined position, which is a snap fit structure. When the securing pin 31 is fixed to the attachment portion 12b, conduction between the securing pin 31 and the metal core 12 is permitted. Specifically, the snap fit structure is a structure that fixes an object by causing elastic engagement of the object when the object is inserted. In the steering wheel 10 of the illustrated embodiment, snap fit structures are employed in the fixing portion between each securing pin 31 and the metal core 12 and the fixing portion between each movable member 32 and the bag holder 21, which will be explained below.

With reference to FIGS. 5 and 6, the movable member 32 is formed of a material having properties as an insulating body (which is, for example, a resin material). The movable member 32 is shaped substantially as a cylinder. The movable member 32 is joined to the securing pin 31 in a manner movable along the longitudinal direction of the securing pin 31. The movable member 32 has a tubular portion 32a through which the securing pin 31 is inserted and a fitting portion 32b formed at the upper end of the tubular portion 32a. The head 31a of the securing pin 31 is engaged with the fitting portion 32b. A step is formed between the tubular portion 32a and the fitting portion 32b. The fitting portion 32b contacts the lower surface and the outer circumferential surface of the head 31a of the securing pin 31. A pair of contact projections 32g and a pair of holding projections 32h are formed at the upper end of the fitting portion 32b and project upward. The contact projections 32g contact an inner surface of the cap 33. The holding projections 32h cooperate with the cap 33 to clamp and hold the contact terminal 34. The contact projections 32g and the holding projections 32h are spaced apart at equal circumferential intervals.

Four spring holding portions 32c (only two are shown in FIGS. 5 and 6) are formed in the movable member 32 and spaced apart at equal circumferential intervals. Before the horn switch mechanism 15 (the securing pin 31) is joined to the metal core 12 (see FIGS. 5 and 3), the spring holding portions 32c hold the coil spring 35. Each of the spring holding portions 32c extends downward from the fitting portion 32b. An engagement projection 32d, which projects toward the tubular portion 32a, is formed at the lower end of each spring holding portion 32c. A clearance is provided between the spring holding portions 32c and the tubular portion 32a, allowing the spring holding portions 32c to flex in a radial direction of the movable member 32 (a direction perpendicular to the axis L of the horn switch mechanism 15).

When each horn switch mechanism 15 is assembled together, the upper end of the coil spring 35 is inserted into the clearance between the tubular portion 32a and the spring holding portions 32c of the movable member 32. At this stage, the coil spring 35 is engaged with the engagement projections 32d of the spring holding portions 32c through elastic shape restoration of the spring holding portions 32c. This holds the coil spring 35 with respect to the movable member 32 (see FIG. 5). As has been described, before the horn switch mechanism 15 is joined to the metal core 12, the upper end of the coil spring 35 is engaged with and held by the engagement projections 32d of the spring holding portions 32c. In other words, since the lower end of the coil spring 35 is free, it is unnecessary to temporarily hold the coil spring 35 in a compressed state.

Figure 7:
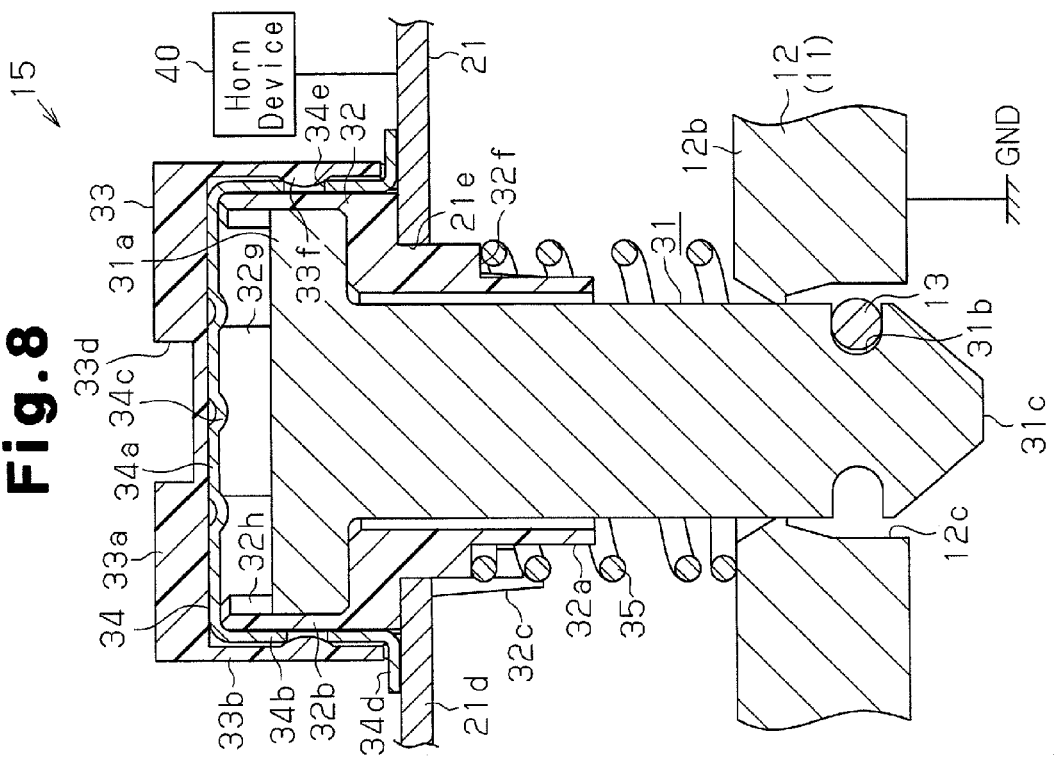
FIG. 7 is a cross-sectional view taken along line 7-7 of FIG. 5, showing the horn switch mechanism in an installed state.

Four holder engagement portions 32e (only one is shown in FIGS. 5 and 6), which extends downward from the fitting portion 32b, are formed in the movable member 32 and spaced apart at equal circumferential intervals. The holder engagement portions 32e are arranged slightly offset from the spring holding portions 32c in the circumferential direction. A clearance is provided between the holder engagement portions 32e and the tubular portion 32a, thus allowing the spring holding portions 32c to flex radially. When the movable member 32 is received in the corresponding attachment hole 21e, the holder engagement portions 32e elastically restore their original shapes and thus become engaged with the lower surface of the bag holder 21 (see FIG. 7). Such operation of the holder engagement portions 32e brings about the snap fit structure of the movable member 32 with respect to the bag holder 21. FIG. 7 shows a cross section of each horn switch mechanism 15 including the holder engagement portions 32e and FIG. 8 shows a cross section of the horn switch mechanism 15 taken along the longitudinal direction of the contact terminal 34.

The cap 33 is joined to the fitting portion 32b of the movable member 32 in such a manner as to cover the securing pin 31 and the movable member 32 from above. The cap 33 has a disk-like portion 33a and a peripheral wall 33b extending downward from the periphery of the disk-like portion 33a. A pair of hooks 33c (only one is shown in FIGS. 5 and 6), which are elastically deformable, are formed in the peripheral wall 33b. The hooks 33c are engaged with a lower surface 32i (see FIG. 6) of the fitting portion 32b of the movable member 32.

An inner surface of the disk-like portion 33a of the cap 33 contacts the contact projections 32g of the movable member 32. This fixes the cap 33 in such a manner that the cap 33 is prohibited from moving in upward and downward directions with respect to the movable member 32.

A groove 33d, by which the orientation of the cap 33 is corrected when the cap 33 is installed, is formed in an upper surface of the disk-like portion 33a. Molding holes 33e for molding the undercut portions of the hooks 33c are formed in the groove 33d at the positions corresponding to the hooks 33c. The molding holes 33e are closed by the contact projections 32g of the movable member 32, which contact the inner surface of the disk-like portion 33a of the cap 33. This prevents foreign matter from entering the interior of the cap 33 through the molding holes 33e. As a result, problems are prevented from occurring in conduction between the securing pin 31 and the contact terminal 34.

When the airbag device 20 is assembled, the upper surface of the cap 33 contacts the switch support portions 24g of the pad 24, which have been described above (see FIG. 3). In this manner, even when the driver severely strikes the airbag device 20, for example, the cap 33 is prevented from separating from the movable member 32 due to the reactive force.

The contact terminal 34 is arranged inside the cap 33. As illustrated in FIGS. 6 and 8, the contact terminal 34 is formed by pressing a metal plate. The contact terminal 34 is formed by a linear upper portion 34a and side portions 34b extending from opposite ends of the upper portion 34a. The contact terminal 34 has a substantially U shaped cross section corresponding to the shapes of the inner surfaces of the cap 33. The contact terminal 34 is arranged in such a manner that the upper portion 34a of the contact terminal 34 extends perpendicular to the axis L of the horn switch mechanism 15. An engagement hole 34e is formed in each of the side portions 34b of the contact terminal 34. A pair of engagement projections 33f, which project from an inner surface of the cap 33, are engaged with the corresponding engagement holes 34e. This holds the contact terminal 34 with respect to the inner peripheral surface of the cap 33. Three contact projections 34c, which project toward the securing pin 31, are formed in the upper portion 34a of the contact terminal 34. The contact projections 34c are spaced apart at equal intervals in the longitudinal direction of the upper portion 34a of the contact terminal 34. The middle one of the contact projections 34c is provided at the longitudinal center of the upper portion 34a of the contact terminal 34.

Each of the side portions 34b of the contact terminal 34 has a bent portion 34d, which is arranged at the lower end of the side portion 34b. Each one of the bent portions 34d is bent in such a manner as to extend outward from the associated one of the side portions 34b. The bent portions 34d contact the upper surface of the bag holder 21 (see FIG. 8). This permits mutual conduction between the bag holder 21 and the contact terminal 34. Specifically, before the horn switch mechanism 15 is joined to the bag holder 21, the angle defined by each bent portion 34d and the associated side portion 34b is greater than 90 degrees (95 degrees in the illustrated embodiment). When the horn switch mechanism 15 is installed, the bent portions 34d are pressed against the upper surface of the bag holder 21 and thus reliably held in contact with the upper surface of the bag holder 21. Also, when the horn switch mechanism 15 is installed, the angle between each bent portion 34d and the associated side portion 34b is substantially 90 degrees. Since the fitting portion 32b of the movable member 32 is arranged between each side portion 34b and the securing pin 31, insulation between the side portions 34b and the securing pin 31 is ensured.

As has been described, in each horn switch mechanism 15 of the illustrated embodiment, the cap 33, to which the contact terminal 34 is joined, is fixed to the movable member 32. The securing pin 31 is installed in the movable member 32 so as not to drop off. The spring holding portions 32c of the movable member 32 hold the coil spring 35. In other words, the horn switch mechanism 15 is an assembly formed by unitizing these multiple independent components (the securing pin 31, the movable member 32, the cap 33, the contact terminal 34, and the coil spring 35) as shown in FIG. 5. Accordingly, when the horn switch mechanism 15 is installed or replaced, the horn switch mechanism 15, which is a unit, is handled as an integral assembly. Further, as has been described, the securing pin 31 is installed in the movable member 32 so as not to drop off and joined to the bag holder 21 through the movable member 32. This prevents the bag holder 21 (the airbag device 20) from coming off the securing pin 31.

After each horn switch mechanism 15 configured as described above is assembled as a unit, the horn switch mechanism 15 is inserted through the corresponding attachment hole 21e of the bag holder 21 and thus fixed. Each attachment hole 21e of the bag holder 21 is shaped circular in correspondence with the shape of the tubular portion 32a of the movable member 32. Each attachment hole 21e has four recesses 21i (see FIG. 4), which extend radially outward. The recesses 21i are spaced apart at equal circumferential intervals. The recesses 21i receive the corresponding spring holding portions 32c of the movable member 32. The recesses 21i of the attachment hole 21e function as circumferential positioning members when the movable member 32 is passed through the attachment hole 21e.

By inserting each movable member 32 through the corresponding attachment hole 21e, the holder engagement portions 32e are engaged with the lower surface of the bag holder 21, as illustrated in FIG. 7. The upper surface of the bag holder 21 contacts the lower end of the peripheral wall 33b of the cap 33 and the lower ends of the hooks 33c of the cap 33. In other words, the horn switch mechanism 15 clamps the bag holder 21 between the holder engagement portions 32e and the cap 33. This configuration allows the movable member 32, the cap 33, and the contact terminal 34 of the horn switch mechanism 15 to move together with the bag holder 21. The movable member 32, the cap 33, and the contact terminal 34 of each horn switch mechanism 15 are movable relative to the securing pin 31. The diameter of each attachment hole 21e is smaller than the diameter of the head 31a of each securing pin 31. This prevents the securing pin 31 from coming off from the attachment hole 21e.

As illustrated in FIG. 3, each horn switch mechanism 15, which has the above-described configuration, is attached to the airbag device 20 before being joined to the metal core 12 of the steering wheel body 11. In this state, the coil springs 35 and the securing pins 31 passed through the coil springs 35 project out of the bag holder 21 in a direction separating from the pad 24. The securing pins 31 are passed through the insertion holes 12c of the corresponding attachment portions 12b of the metal core 12 (see FIG. 2) and thus fixed to the attachment portions 12b. The airbag device 20 is thus joined to the metal core 12. In other words, the securing pins 31 of the horn switch mechanisms 15, which are fixed to the metal core 12, support the airbag device 20 (the bag holder 21) with respect to the metal core 12 through the movable members 32, in such a manner that the airbag device 20 is allowed to selectively proceed and retreat. That is, the airbag device 20 is allowed to selectively approach and separate from the metal core 12.

Before the airbag device 20 is joined to the metal core 12, the distal ends 31c of the securing pins 31 project from the lower ends (the free ends separated from the bag holder 21) of the corresponding coil springs 35. Accordingly, when the airbag device 20 is joined to the metal core 12, the airbag device 20 is positioned by slightly engaging the distal end 31c of each securing pin 31 with the corresponding insertion hole 12c of the metal core 12.

By inserting each securing pin 31 through the corresponding insertion hole 12c, the lower end of the associated coil spring 35 is brought into contact with the metal core 12 (the corresponding attachment portion 12b). By fixing the securing pin 31 in the insertion hole 12c, the coil spring 35 is held in a state compressed between the movable member 32 and the metal core 12. Specifically, the coil spring 35 is compressed to such an extent that the airbag device 20 is allowed to move toward the metal core 12. In other words, the coil spring 35 is compressed in such a manner as to ensure a horn stroke from the position at which the coil spring 35 separates the contact terminal 34 from the securing pin 31 (the state in which the horn switch mechanism 15 is turned off) to the position at which the airbag device 20 is pressed against the metal core 12 and the coil spring 35 causes the contact terminal 34 to contact the securing pin 31 (the state in which the horn switch mechanism 15 is turned on). In this assembled state (see FIG. 8), the upper end of each coil spring 35 contacts a step 32f, which is formed in the tubular portion 32a of the movable member 32. The coil spring 35 urges the movable member 32 away from the metal core 12. That is, the coil spring 35 supports the airbag device 20 as a whole through the movable member 32 in such a manner that the contact terminal 34 and the securing pin 31 are prevented from contacting each other.

When the airbag device 20 is depressed, the movable member 32 of at least one of the horn switch mechanisms 15 is pressed through the bag holder 21 against the urging force of the coil spring 35. This moves the movable member 32 toward the metal core 12 (downward as viewed in FIG. 8). At this stage, the cap 33 moves toward the metal core 12 together with the bag holder 21 and the movable member 32. At least one of the three contact projections 34c of the contact terminal 34 contacts the upper surface of the securing pin 31. This permits mutual conduction between the metal core 12, which is connected to the ground GND (the vehicle body ground), and the bag holder 21 through the securing pin 31 and the contact terminal 34. As a result, a horn device 40 (a horn) of the vehicle, which is electrically connected to the bag holder 21, is activated. In other words, in each horn switch mechanism 15 of the illustrated embodiment, the securing pin 31 supporting the airbag device 20 functions also as a fixed contact that contacts the contact terminal 34 serving as a movable contact. This reduces the number of components of the airbag device 20, compared to an airbag device in which a support member of the airbag device 20 and a fixed contact member of the horn switch mechanism 15 are provided independently from each other.

It is preferred that the three contact projections 34c of the contact terminal 34 of each horn switch mechanism 15 be aligned in a radial direction (along a radial line) of the steering wheel 10. This configuration ensures contact between the contact terminal 34 and the upper surface of the securing pin 31 when the airbag device 20 is depressed, thus improving the electric connection between the contact terminal 34 and the securing pin 31. Further, in the illustrated embodiment, the three horn switch mechanisms 15 are provided and the horn switch mechanisms 15 are separated from the center of the steering wheel 10 by equal distances. This also enhances the electric connection between the contact terminal 34 and the upper surface of the securing pin 31.

When the airbag device 20, which is configured as described above, is assembled, the bag holder 21 is arranged in such a manner that the surface of the bag holder 21 facing the pad 24 faces upward. The components (the horn switch mechanisms 15, the ring retainer 25, the airbag 22, and the pad 24) are assembled with the bag holder 21 from above. Then, the assembled body is reversed and then the inflator 23 is joined to the bag holder 21.

The airbag device 20 of the illustrated embodiment has the following advantages.

(1) In the illustrated embodiment, the horn switch mechanisms 15 are fixed to the metal core 12 of the steering wheel body 11. The horn switch mechanisms 15 supports the bag holder 21 in such a manner that the bag holder 21 is allowed to selectively proceed toward or retreat from the metal core 12 (in other words, to selectively approach and separate from the metal core 12). Each horn switch mechanism 15 includes the securing pin 31 serving as the support member and the movable member 32 serving as the insulating portion, which is arranged between the securing pin 31 and the bag holder 21 and electrically insulates the securing pin 31 and the bag holder 21 from each other. The horn switch mechanism 15 also includes the coil spring 35 serving as the urging member and the contact terminal 34 serving as the movable contact. The coil spring 35 urges the bag holder 21 away from the metal core 12. The contact terminal 34 moves together with the bag holder 21. When the bag holder 21 moves toward the metal core 12 against the urging force of the coil spring 35, the contact terminal 34 contacts the securing pin 31, thus causing conduction between the contact terminal 34 and the securing pin 31. This activates the horn device 40 of the vehicle. In other words, the securing pin 31 of the horn switch mechanism 15 functions also as the fixed contact, thus making it unnecessary to provide a component such as a horn plate, which is necessary in the conventional art. This reduces the number of components of the airbag device 20 and correspondingly decreases the number of assembly steps.

(2) In the illustrated embodiment, the insulating portion of each horn switch mechanism 15 is the movable member 32, which is movable together with the bag holder 21. The coil spring 35 is arranged between the metal core 12 and the movable member 32 and urges the bag holder 21 away from the metal core 12 through the movable member 32. This allows the securing pin 31 to support the bag holder 21 through the movable member 32. Also, the urging force acting in the direction in which the coil spring 35 separates from the metal core 12 is applied to the bag holder 21.

(3) In the illustrated embodiment, each movable member 32 has the spring holding portions 32c, which hold the coil spring 35. Accordingly, before the airbag device 20 is fixed to the metal core 12, the coil spring 35 is held by the movable member 32 and thus prevented from coming off.

(4) In the illustrated embodiment, each horn switch mechanism 15 has the cap 33, which is fixed to the movable member 32 in such a manner as to cover the securing pin 31. The contact terminal 34 is arranged inside the cap 33. This allows the contact terminal 34 to move together with the bag holder 21.

(5) In the illustrated embodiment, each horn switch mechanism 15 is provided as a unit. The horn switch mechanism 15 is joined to the bag holder 21 in the state of the unit. This facilitates installation of the horn switch mechanism 15.

The illustrated embodiment may be modified to the following forms.

The configuration of the bag holder 21 of the illustrated embodiment may be modified as needed. In the embodiment, holes such as the engagement holes 21b and the attachment holes 21e are employed as installing portions for joining the pad 24 and each horn switch mechanism 15 to each other. However, the holes may be replaced by installing portions other than the holes, which are, for example, projections. Also, the locations of the engagement holes 21b or the locations of the attachment holes 21e may be changed as needed.

Although the bag holder 21 is machined through pressing in the illustrated embodiment, the bag holder 21 may be formed in a different manner, which is, for example, die casting.

Although the contact terminal 34 of the illustrated embodiment has the three contact projections 34c, the number of the contact projections 34c may be more than or less than three.

Although the three horn switch mechanisms 15 are employed in the illustrated embodiment, the number of the horn switch mechanisms 15 may be more than or less than three.

In the illustrated embodiment, the snap fit structures are employed to fix the securing pins 31 and the attachment portions 12b of the metal core 12 together. However, other means, such as threading structures, may be employed.

In the illustrated embodiment, the snap fit structures in which the movable members 32 are fixed to the bag holder 21 simply by inserting the movable members 32 through the attachment holes 21e are employed to fix the horn switch mechanisms 15. However, other structures may be used for this purpose. For example, a plurality of extended portions may be formed in the movable member 32 of each horn switch mechanism 15 and extended radially from the tubular portion 32a. Each attachment hole 21e of the bag holder 21 has a plurality of recesses corresponding to the extended portions. The horn switch mechanism 15 is inserted through the attachment hole 21e with the extended portions facing the corresponding recesses. Then, by rotating the horn switch mechanism 15, the extended portions become engaged with the lower surface (the surface facing the metal core 12) of the bag holder 21.

In the illustrated embodiment, the switch support portions 24g of the pad 24 are located outside the accommodation wall 24b. However, the switch support portions 24g may be arranged inside the accommodation wall 24b (in the bag accommodation space X). This configuration reduces the size of the airbag device. Alternatively, the switch support portions 24g may be formed in such a manner as to straddle the accommodation wall 24b from inside to outside.

Therefore, the present examples and embodiments are to be considered as illustrative and not restrictive and the invention is not to be limited to the details given herein, but may be modified within the scope and equivalence of the appended claims.

What is claimed is:

1. A steering wheel having an airbag device of a vehicle, the steering wheel including a metal core fixed to a steering shaft of the vehicle and a horn switch mechanism by which a horn of the vehicle is activated, the airbag device being joined to the metal core, the horn being activated through the horn switch mechanism when the airbag device is depressed, the airbag device including:

a pad;
   a bag holder attached to a backside of the pad; and
   an airbag received in a space between the pad and the bag holder in a folded state, wherein the horn switch mechanism includes:

a support member that is fixed to the metal core and supports the bag holder in such a manner that the bag holder is allowed to selectively proceed toward and retreat from the metal core, wherein the support member has a first end portion that is fixed to the metal core and a second end portion located opposite to the first end portion, and wherein the second end portion is supported by the bag holder and forms a fixed contact of the horn switch mechanism;

an insulating portion arranged between the support member and the bag holder to electrically insulate the support member and the bag holder from each other;

an urging member urging the bag holder away from the metal core; and a movable contact moving together with the bag holder, wherein, when the bag holder and the movable contact move toward the metal core against the urging force of the urging member, the movable contact contacts the fixed contact to permit conduction in the horn switch mechanism, thereby activating the horn, wherein the insulating portion of the horn switch mechanism is a movable member that is movable together with the bag holder, wherein the urging member is arranged between the metal core of the steering wheel and the movable member and urges the bag holder away from the metal core through the movable member, and wherein the horn switch mechanism further includes a cap fixed to the movable member in such a manner as to cover the support member, and wherein the movable contact is arranged inside the cap.

2. The steering wheel having the airbag device according to claim 1, wherein the movable member has a holding portion holding the urging member.

3. The steering wheel having the airbag device according to claim 2, wherein the urging member is formed by a coil spring, and wherein an end of the coil spring is held by the holding portion.

4. The steering wheel having the airbag device according to claim 1, wherein the movable contact is formed by a metal plate fixed along an inner surface of the cap.

5. The steering wheel having the airbag device according to claim 4, wherein the support member is formed by a metal pin having a head, the head of the pin being accommodated in the cap, the movable contact being arranged between the head of the pin and the cap and normally separated from the head of the pin by a distance, the movable contact contacting the head of the pin when the airbag device is depressed.

6. The steering wheel having the airbag device according to claim 1, wherein the horn switch mechanism is assembled as a unit before being joined to the bag holder.

7. The steering wheel having the airbag device according to claim 1, wherein the horn switch mechanism is fixed to the metal core through a snap fit structure.

* * * * *